United States Patent
Hu et al.

(10) Patent No.: US 9,820,248 B2
(45) Date of Patent: Nov. 14, 2017

(54) NETWORK CLOCK SYNCHRONIZATION

(71) Applicant: INTERNATIONAL BUSINESS MACHINES CORPORATION, Armonk, NY (US)

(72) Inventors: Qian Hu, Shanghai (CN); Yang Liu, Shanghai (CN); Cheng Wei Song, Beijing (CN); Kai Yang, Beijing (CN)

(73) Assignee: GLOBALFOUNDRIES INC., Grand Cayman (KY)

( * ) Notice: Subject to any disclaimer, the term of this patent is extended or adjusted under 35 U.S.C. 154(b) by 247 days.

(21) Appl. No.: 14/755,621

(22) Filed: Jun. 30, 2015

(65) Prior Publication Data

US 2017/0006567 A1    Jan. 5, 2017

(51) Int. Cl.
*H04J 3/06* (2006.01)
*H04W 56/00* (2009.01)
*H04L 1/00* (2006.01)

(52) U.S. Cl.
CPC ......... *H04W 56/0015* (2013.01); *H04L 1/004* (2013.01)

(58) Field of Classification Search
None
See application file for complete search history.

(56) References Cited

U.S. PATENT DOCUMENTS

| | | | | |
|---|---|---|---|---|
| 2004/0234000 A1* | 11/2004 | Page | ............... | H04J 3/00 375/259 |
| 2006/0238547 A1* | 10/2006 | Spencer | ............ | G06F 17/30893 345/619 |
| 2009/0022304 A1* | 1/2009 | Kubler | ............... | G06F 1/1626 379/229 |
| 2010/0031036 A1* | 2/2010 | Chauncey | ........... | H04L 63/0428 713/168 |
| 2010/0142518 A1* | 6/2010 | Kubler | ............... | G06F 1/1626 370/352 |
| 2010/0272102 A1* | 10/2010 | Kobayashi | ......... | H04N 21/4305 370/389 |
| 2010/0287402 A1 | 11/2010 | Kim et al. | | |
| 2011/0016232 A1 | 1/2011 | Lee et al. | | |
| 2011/0216747 A1 | 9/2011 | Shao et al. | | |
| 2012/0026041 A1* | 2/2012 | Murdock | ............ | G01S 5/0289 342/387 |
| 2012/0069944 A1* | 3/2012 | Hadzic | ................. | H04J 3/0667 375/376 |
| 2013/0121352 A1* | 5/2013 | Shen | ..................... | H04J 3/0667 370/503 |
| 2013/0254237 A1* | 9/2013 | Agarwal | .................. | G06F 7/00 707/792 |
| 2014/0149526 A1* | 5/2014 | Magee | ................ | H04L 43/0858 709/208 |

(Continued)

*Primary Examiner* — Phirin Sam
(74) *Attorney, Agent, or Firm* — David Cain; Andrew M. Calderon; Roberts Mlotkowski Safran Cole & Calderon, P.C.

(57) ABSTRACT

According to example embodiments of the present invention, predetermined patterns are inserted into data streams and exchanged between a master node and a slave node. By recognizing the patterns near the underlying interface of the physical layer, the master node and slave node can generate timestamps that exactly identify when the respective messages leaves and/or arrives at the physical layer. The slave clock can be synchronized to the master clock based on such timestamps.

18 Claims, 5 Drawing Sheets

(56) References Cited

U.S. PATENT DOCUMENTS

2015/0092794 A1* 4/2015 Aweya .................. H04J 3/0667
                                                    370/503
2016/0149654 A1* 5/2016 Whitby-Strevens ... H04B 17/21
                                                    375/224
2016/0299484 A1* 10/2016 Nair ................... G05B 19/0425

* cited by examiner

NETWORK CLOCK SYNCHRONIZATION

BACKGROUND

Lots of applications are increasingly using distributed system technologies such as network communication, local computing, and distributed objects. Different nodes in the distributed system may communicate with each other by local area networks supporting multicast messaging including, but not limited to, Ethernet. In such a system, it is usually required to synchronize the clocks among different nodes. The accuracy of clock synchronization is very important and has direct impact on the accuracy of clocks in local systems. Some applications require very high accuracy of clock synchronization especially in the system including a large number of nodes.

Generally speaking, the clock synchronization is done in the master-slave architecture. Typically, several messages can be exchanged between a master node and a slave node(s), such that the clock at the slave node is synchronized to the clock of the master node according to the timestamps of the transmission and reception of the messages. Conventionally the frame structure of the message packets can be only detected at the layer above the Medium Independent Interface (MII) between the Medium Access Control (MAC) layer and the physical (PHY) layer.

SUMMARY

In general, example embodiments of the present invention include a method, device and computer program product for clock synchronization.

In an aspect, embodiments of the present invention provide a computer-implemented method. The method comprises inserting a first pattern into an outgoing data stream to be transmitted from a master node to a slave node. The method further comprises generating a first timestamp identifying when the first pattern is sent out from a physical layer of the master node. The method further comprises generating a fourth timestamp identifying when a second pattern arrives at the physical layer of the master node, where the second pattern is inserted in an incoming data stream transmitted from the slave node to the master node. The first timestamp and the fourth timestamp will be sent from the master node to the slave node for clock synchronization between the master node and the slave node.

In another aspect, embodiments of the present invention provide a computer-implemented method. The method comprises generating a second timestamp identifying when a first pattern arrives at a physical layer of a slave node, where the first pattern is inserted in an incoming data stream that is transmitted from the master node to the slave node. The method further includes inserting a second pattern into an outgoing data stream to be transmitted from the slave node to the master node, generating a third timestamp identifying when the second pattern is sent out from the physical layer of the slave node. The second timestamp and the third timestamp are used for clock synchronization between the master node and the slave node.

In yet another aspect, embodiments of the present invention provide an apparatus. The apparatus includes a pattern inserter, a first pattern recognizer and a second pattern recognizer. The pattern inserter is configured to insert an outgoing pattern into an outgoing data stream to be transmitted from a first node to a second node. The first pattern recognizer is configured to recognize the outgoing pattern at the first node for generating an outgoing timestamp which identifies when the outgoing pattern is sent out from the physical layer of the first node. The second pattern recognizer configured to recognize an incoming pattern at the first node for generating an incoming timestamp which identifies when the incoming pattern arrives at the physical layer of the first node, where the incoming pattern is inserted in an incoming data stream transmitted from the second node to the first node.

It is to be understood that the Summary is not intended to identify key or essential features of embodiments of the present invention, nor is it intended to be used to limit the scope of the present invention. Other features of the present invention will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present invention will now be described with reference to some example embodiments. It is to be understood that these embodiments are described only for the purpose of illustration and help those skilled in the art to understand and implement the present invention, without suggesting any limitations as to the scope of the invention. The invention described herein can be implemented in various manners other than the ones describe below.

As used herein, the term "includes" and its variants are to be read as opened terms that mean "includes, but is not limited to." The term "based on" is to be read as "based at least in part on." The term "one embodiment" and "an embodiment" are to be read as "at least one embodiment."

The term "another embodiment" is to be read as "at least one other embodiment." Other definitions, explicit and implicit, may be included below.

Figure 1:
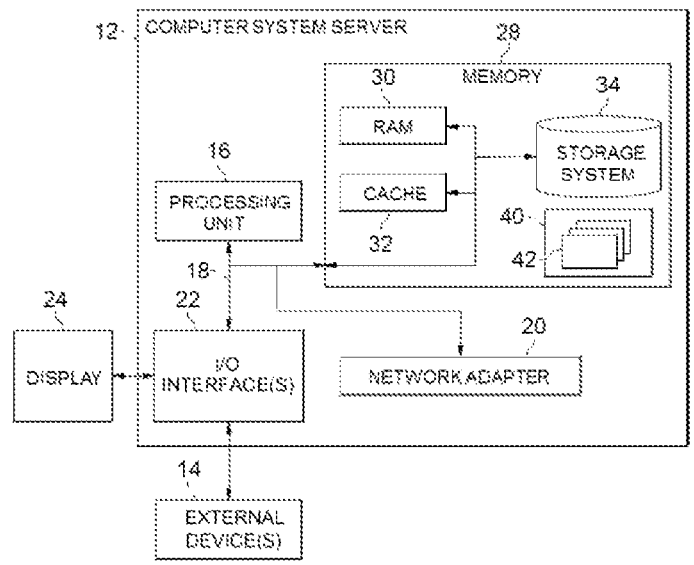
FIG. 1 is a block diagram of an electronic device in which embodiments of the present invention can be implemented.

Reference is first made to FIG. 1, in which an exemplary electronic device or computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

Figure 2:
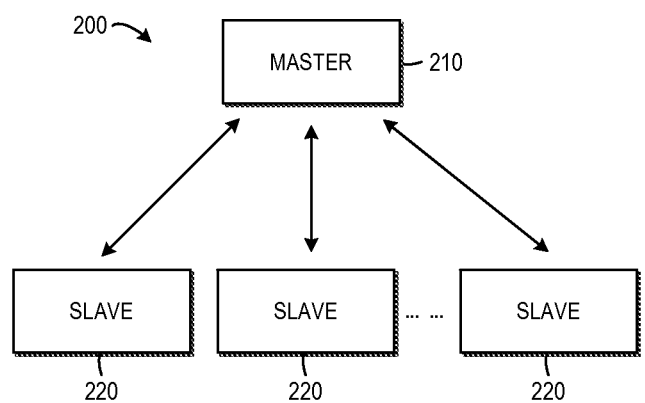
FIG. 2 is an environment in which the embodiments of the present invention can be implemented.

FIG. 2 shows an environment in which embodiments of the present invention can be implemented. In some embodiments, the environment 200 may be a distributed system including a master node 210 and one or more slave nodes 220. In the shown example, the clock at the master node 210 serves as the master clock in the system. The slave nodes synchronize their local clocks (slave clocks) to the master clock. The master node and one or more of the slave nodes can be implemented by computer system/server 12 as discussed with reference to FIG. 1, for example. The master node 210 and the slave nodes 220 may communicate with one another via any suitable communication medium including, but not limited to, Ethernet.

Conventionally, the master node 210 may initiate the clock synchronization with a slave node 220 by sending a synchronization message to the slave node 220. The master node 210 then sends a follow-up message to provide the slave node 220 with a timestamp (denoted as "$T_1$") identifying when the synchronization message is sent out from the master node 210. The slave node 220 receives the synchronization message and the follow-up message and generates a timestamp (denoted as "$T_2$") identifying when the synchronization message arrives at the slave node 220. Then the slave node 220 sends a delay request message to the master node 210 and generates a timestamp (denoted as "$T_3$") identifying when the delay request message is sent out from the slave node 220. The master node 210 receives the delay request message and generates a timestamp (denoted as "$T_4$") identifying when the delay request message arrives at the master node 210. The timestamp $T_4$ is then sent back to the slave node 220 in a delay response message. The slave clock can be synchronized to the master clock using the timestamps $T_1$ to $T_4$.

Generally speaking, the timestamps are generated by a time stamping unit (TSU) which is located between the MAC layer and the PHY layer. In order to obtain high accuracy for the detected absolute time value, it is desired to locate the TSU close to physical layer as much as possible. However, the frame structure of the data packets can only be detected at the layers above the MII which is deployed between the MAC layer and the PHY layer. Therefore, in conventional solutions, the TSU is located at the MMI. As a result, the timestamps cannot precisely reflect the actual time points when the messages leave or arrive at the PHY layer, which will decrease the accuracy of the clock synchronization.

In accordance with embodiments of the present invention, the accuracy of the clock synchronization is improved by inserting and recognizing predetermined patterns in the data streams transmitted between the master node 210 and the slave node 220. The patterns are recognized near the underlying PHY interface (IF). In this way, it is possible to generate timestamps exactly identifying when the messages are sent out from the PHY layer and/or received into the PHY layer. The accuracy of clock synchronization based on such timestamps can be significantly improved, for example, to sub-nanosecond level.

Figure 3:
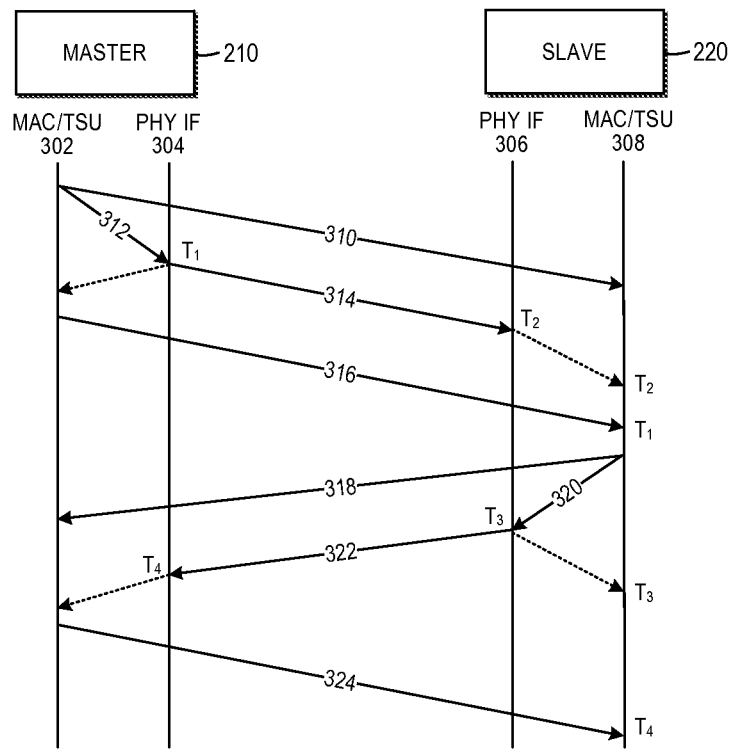
FIG. 3 is a flowchart of a process for clock synchronization between a master node and a slave node in accordance with embodiments of the present invention.

FIG. 3 shows a process for clock synchronization between the master node 210 and a slave node 220 in accordance with embodiments of the present invention. More specifically, FIG. 3 shows the message exchange and timestamp generation performed by the MAC/TSU 302 and PHY IF 304 of the master node 210 and the PHY IF 306 and MAC/TSU 308 of the slave node 220.

In some embodiments, the PHY IFs 304 and/or 306 may be implemented as the Serdes (Serializer/Deserializer), for example, the High Speed Serdes (HSS) in the PHY layer. The Serdes IF may serialize the outgoing parallel data into series data and deserialize the incoming series data into parallel data. In the following, some embodiments will be described with reference to the HSS. It is to be understood that the PHY IF is not necessarily implemented as the HSS. Any other suitable types of interfaces are possible as well. For example, in some embodiments, the PHY IFs 304 and/or 306 may include other types of serializer and/or deserializer.

In operation, the master node 210 initiates the clock synchronization process by sending (310) a synchronization message to the slave node 220. Traditionally, the TSU in the master node 210 generates a timestamp identifying when the synchronization message is sent out from the MAC layer and informs the slave node 220 of the timestamp. However, there is gap between this timestamp and the time point when the message is sent out from the PHY IF 304, as described above.

In accordance with embodiments of the present invention, after the synchronization message is sent (310) from the MAC/TSU 302, a predetermined pattern (referred to as the "first pattern") is inserted (312) into the data stream to be transmitted from the master node 210 to the slave node 220. The first pattern may be of any suitable size and content known to both the master node 210 and the slave node 220. The first pattern may be determined according to one or more criteria.

In some embodiments, the first pattern may be designed such that the first pattern can be easily recognized. In addition, or alternatively, the first pattern may be designed to keep the direct current (DC) balance. In some embodiments, the first pattern may be designed to have one or more RAS (reliability, availability and serviceability) features in order to ensure the signal quality. In addition, or alternatively, the first pattern may be designed in such a way that the probability of occurrence of this pattern in useful data packets is low enough. For example, in one embodiment, a series of "F" which is not likely to occur in real data packets may act as the first pattern.

Figure 4:
FIG. 4 is a block diagram of a predetermined pattern for clock synchronization in accordance with embodiments of the present invention.

In some embodiments, the size of the first pattern may be determined based on the property of FEC (if enabled) in the PHY layer. For example, the size of the first pattern may be the least common multiple of the size of a physical coding sub-layer (PCS) block and the number of bits in a FEC symbol. As an example, FIG. 4 shows a schematic diagram of an example of the inserted first pattern 400. In this example, it is supposed that 10G FEC is enabled in the PHY layer of the master node 210. It means that the length of a FEC symbol is 1 bit. It is also known that the size of a PCS block is 66 bits. As a result, the size of the first pattern 400 is 66 bits. In another embodiment where Reed-Solomon (RS) FEC is enabled, one FEC symbol has 10 bits. At this point, the possible size of the first pattern may be 330 bits.

In accordance with embodiments of the present invention, the first pattern may be inserted by a pattern inserter of the master node 210. In some embodiments, the pattern inserter can be implemented as a component in the PHY layer of the master node 210. More specifically, in one embodiment, it is possible to locate the pattern inserter in the PCS. Depending on the specific configuration of the PHY layer, the pattern inserter may be implemented in various different ways.

Figure 5:
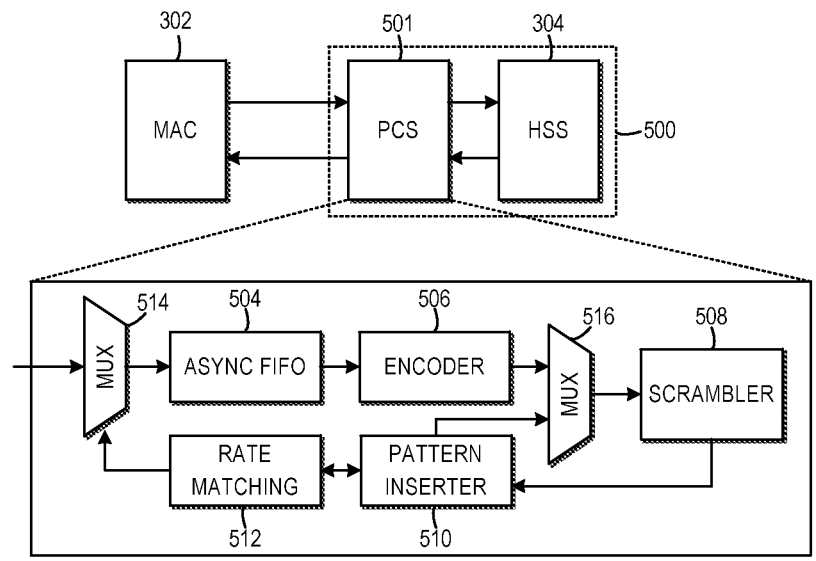
FIG. 5 is a block diagram illustrating a pattern inserter in the PHY layer without forward error correction (FEC) in accordance with embodiments of the present invention.

For example, in some embodiments, the PHY layer of the master node 210 does not enable the FEC. That is, no FEC will be performed on the outgoing data stream in the PHY layer. In this event, the pattern inserter may be coupled between a scrambler and rate matching logic in the PCS of the PHY layer, for example. FIG. 5 shows a pattern inserter in the PHY layer without FEC. In the example shown in FIG. 5, the pattern inserter is implemented in the PCS 501 in the PHY layer 500. The PCS 502 is located between the MAC layer 302 and the PHY IF. In this case, the HSS acts as the PHY IF 304.

As shown, in addition to the pattern inserter 510, the PCS 501 includes an asynchronous first-in-first-out (FIFO) queue 504 for receiving data from the MAC layer 302, an encoder 506 for encoding the data, a scrambler 508 for scrambling the data, and rate matching logic 512 for control the data rate to match the clocks in the MAC layer 302 and the PHY layer 500. The PCS 501 further includes multiplexers 514 and 516 that couples respective components. In this embodiment, the encoder 506, scrambler 508, pattern inserter 510 and rate matching logic 512 form a loop in the PCS.

In operation, the pattern inserter 510 determines a raw pattern based on an output of the scrambler 508. More specifically, the raw pattern is determined in such a way that scrambling the raw pattern by the scrambler 508 will produce the predetermined first pattern. That is, in the case that the raw pattern is input into the scrambler 508, the output of the scrambler 508 is the first pattern. For example, it is supposed that the first pattern is 66 bits of "F." Then the pattern inserter 510 determines a raw pattern such that 66 bits of "F" can be produced by scrambling the raw pattern by the scrambler 508. This ensures that the first pattern is recognizable after the scrambling.

It would be appreciated that the insertion of the raw pattern will affect the data throughput. In some embodiments, such throughput cost can be compensated, for example, by removing one or more block from the gap between data packets. Within the gap, there is no bit having physical meaning to layers other than the PHY layer. For example, for the Ethernet based system, an Inter Packet Gap (IPG) is used to fill the gap between two MAC frames. An IPG includes idle bits between data packets to provide recovery time that allows devices to prepare for reception of the next packet or for another purpose. The minimum size of IPG is 12 bytes (e.g. 1 terminate plus 11 idle), for example. The maximum packet length in Ethernet protocol is 1.5K bytes. For backplane application, the maximum packet length can be 9K bytes. Therefore, there are plenty of blocks that can be used to compensate for the throughput cost caused by the insertion of the first pattern.

The number of blocks to be removed is determined depending on the size of the raw pattern to be inserted. In such embodiments, the pattern inserter 510 provides the size of the raw pattern to the rate matching logic 512. The rate matching logic 512 then controls the encoder 506 and the pattern inserter 510 to insert the raw pattern. For example, under the control of the rate matching logic 512, the encoder 506 may suspend the encoding and scrambling of the data for a time interval, thereby removing one or more blocks for compensation for the first pattern. The length of the time interval is determined by the rate matching logic 512 based on the size of the raw pattern. During this time interval, the pattern inserter 510 provides the raw pattern to the scrambler 508 via the multiplexer 516.

Figure 6:
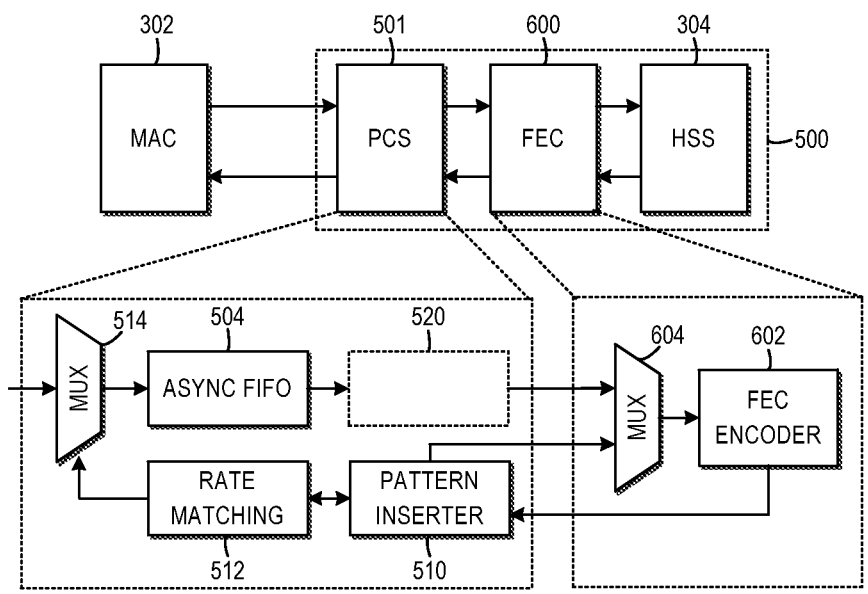
FIG. 6 is a block diagram illustrating a pattern inserter in the PHY layer with FEC in accordance with embodiments of the present invention.

Alternatively, in other embodiments, the PHY layer of the master node 210 includes FEC functionalities. That is, the PHY layer includes logic for performing FEC encoding and other relevant operations on the data. In this event, what is input into the PHY IF (for example, the HSS) is the data output from the FEC encoder rather than the PCS scrambler. Accordingly, in those embodiments, the raw pattern to be inserted may be determined based on the output of the FEC encoder. FIG. 6 shows an example of the pattern inserter in the PHY layer with FEC.

In the example shown in FIG. 6, the PHY layer 500 includes FEC logic 600 located between the PCS 501 and HSS 304. The FEC logic 600 is configured to control errors in data transmission over unreliable or noisy communication channels by adding redundancy to the transmitted data stream. The FEC logic 600, among other things, includes a FEC encoder 602 to encode the data that is input via the multiplexer 604. In FIG. 6, the block 520 represents one or more components in the PCS such as the scrambler 508 as shown in FIG. 5.

In operation, the pattern inserter 510 determines a raw pattern based on the output of the FEC encoder 602. More particularly, the raw pattern is determined in such a way that applying FEC encoding on the raw pattern by the FEC encoder 602 will produce the predetermined first pattern. Similar to the embodiments without FEC, the size of the determined raw pattern may be provided to the rate matching logic 512. Based on the size of the raw pattern, the rate matching logic 512 determines a time interval of a certain length. During the time interval, the rate matching further controls the pattern inserter 510 to input the raw pattern into the FEC encoder 602 for FEC encoding to generate the first pattern. In one embodiment, the FEC encoder 602 may insert the first pattern at the beginning of a FEC code word. In addition, or alternatively, in one embodiment, some RAS features may be included to prevent false alarm.

It is to be understood that the embodiments shown in FIGS. 5 and 6 are discussed merely for the purpose of illustration, without suggesting any limitation as to the scope of the present invention. In alternative embodiments, the pattern inserter may be implemented in other suitable ways as long as the pattern is recognizable to both the master node 210 and the slave node 220. For example, in some embodiments, the pattern inserter may be located at a sub-layer other than the PCS.

Still with reference to FIG. 3, after the first pattern is inserted (312) by the pattern inserter of the master node 210, the first timestamp $T_1$ is generated to identify when the inserted first pattern is sent out from the PHY IF 304 of the master node 210. In accordance with embodiments of the present invention, this is done by recognizing the first pattern in a location that is near to the PHY IF 304. In accordance with embodiments of the present invention, the master node 210 includes a pattern recognizer to recognize the first pattern.

In some embodiments, the pattern recognizer may be located in the PHY layer of the master node 210. As described above, it is desired to locate the pattern recognizer close the outlet of the PHY layer as much as possible. In one embodiment, the pattern recognizer may be located immediately before the PHY IF 304 (for example, the HSS). For example, if the FEC is enabled in the PHY layer of the master node 210, the pattern recognizer may be located between the HSS and FEC logic. If the PHY layer of the master node 210 includes no FEC logic, the pattern recognizer may be located between the HSS and the PCS.

Figure 7:
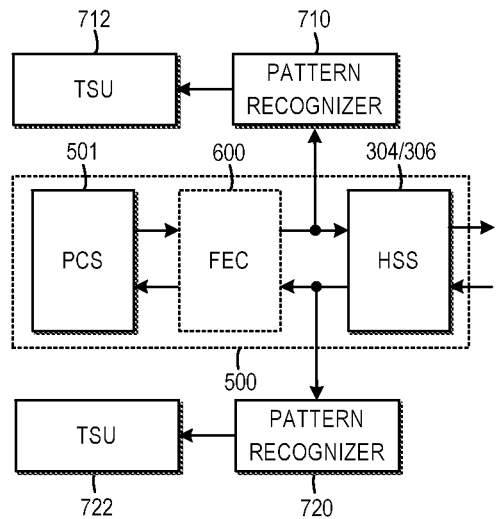
FIG. 7 is a block diagram illustrating pattern recognizers in the PHY layer in accordance with embodiments of the present invention.

FIG. 7 shows an example of the pattern recognizer in accordance with embodiments of the present invention. In the example shown in FIG. 7, a first pattern recognizer 710 in the master node 210 is located immediately before the HSS 304 of the master node 210. As described above, if the PHY layer 500 includes the FEC logic 600, the first pattern recognizer 710 is located between the HSS 304 and the FEC logic 600. If the PHY layer 500 does not enable the FEC, the first pattern recognizer 710 is located between the HSS 304 and the PCS 501. As shown, the first pattern recognizer 710 is coupled to a first TSU 712. In addition, there is also a second pattern recognizer 720 coupled to a second TSU 722, which will be discussed in the following paragraphs.

In operation, the first pattern recognizer 710 in the master node 210 recognizes the first pattern. This is possible because the size and content of the first pattern is known to the first pattern recognizer 710. Once the first pattern is recognized, the pattern recognizer 710 may determine the offset of the first pattern. More specifically, in order to transmit the data stream over the network, the HSS 304 usually serializes the parallel data stream into series data stream. To this end, the HSS 304 includes a serializer which receives the outgoing data stream via a parallel data interface, serializes the data stream and then outputs the serialized data via a series data interface. The parallel data interface has a width which is defined by the number of bits that can be input into the serializer in one shot. The first pattern recognizer 710 may determine the offset of the first pattern with respect to the width of the parallel data interface.

In addition, it would be appreciated that the first pattern recognizer 710 needs one or more clock periods to complete the recognition of the first pattern, depending the size of the first pattern. For example, if the size of the first pattern is 66 bits and the width of the parallel data interface is 32 bits, then it will take three clock periods to recognize the first pattern. The time period required for the pattern recognition is referred to the recognition delay. The first pattern recognizer 710 may determine the recognition delay associated with the first pattern.

The first pattern recognizer 710 provides the first TSU 712 with the offset of the first pattern and the recognition delay. Using such information, the first TSU 712 may determine the time point when the first pattern is recognized before serialization. It would be appreciated that this time point is represented in the domain of a low speed clock of the HSS 304 which is used for the parallel data interface. The HSS 304 further has a high speed clock for the series data interface. The first TSU 712 may obtain the information of the low speed clock and high speed clock from the HSS 304.

By transforming the time point from the low speed clock domain to the high speed clock domain, the first TSU 712 may generate the first timestamp $T_1$ that exactly identifies when the first pattern exits the HSS 304 of the master node 210.

Referring back to FIG. 3, the first pattern is sent (314) from the master node 210 to the slave node 220 and received by the PHY IF 306 of the slave node 220. The PHY IF 304 sends the generated first timestamp $T_1$ to the MAC layer 302, which in turn sends (316) the first timestamp $T_1$ to the slave node 220 for use in the clock synchronization.

Upon receipt of the first pattern sent (314) from the master node 210, the slave node 220 generates a second timestamp $T_2$ identifying when the first pattern arrives at the PHY layer (more specifically, the PHY IF such as HSS 306) of the slave node 220. Again the recognition of the first pattern may be done by a pattern recognizer in the slave node 220. The pattern recognizers in the slave node 220 are similar to those in the master node 210 as discussed above with reference to FIG. 7. More specifically, in some embodiments, the slave node 220 may include a first pattern recognizer 710 coupled to a first TSU 712 and a second pattern recognizer 720 coupled to a second TSU 722.

In operation, the PHY IF 306 such as the HSS of the slave node 220 receives the series data stream over the network. Usually the HSS deserializes the series data and provides the resulting parallel data to the second pattern recognizer 720. The deserialization may be done by a deserializer in the HSS 306. Similar to the serializer, the deserializer includes a series data interface that operates under control of a high speed clock to receive series data. The deserializer further includes a parallel data interface that operates under control of a low speed clock to output parallel data. If the second pattern recognizer 720 in the slave node 220 recognizes the first pattern after the incoming data stream is deserialized, the offset of the first pattern with respect to the width of the parallel interface of the deserializer is determined. The second pattern recognizer 720 provides the offset and associated recognition delay to the second TSU 722. The second TSU 722 in turn determines the time point at which the first pattern is detected in the deserialized parallel data. The TSU 722 further knows information about the low speed clock the high speed clock for the deserializer. By transmitting the time point in the low speed clock domain to the high speed clock domain, the second TSU 722 may determine the exact time when the first pattern arrives at the PHY IF 306 of the slave node 220, thereby generating the second timestamp $T_2$.

Specifically, as described above, the first pattern may be selected such that the probability of occurrence of this pattern in normal data packets is quite low. However, it is still possible for a normal data packet to include a portion identical to the first pattern. If so, a false detection may occur. In order to reduce the risk of the false detection, in some embodiments, the recognition of the first pattern at the slave node 220 may be performed only within a guard time interval. For example, in one embodiment, after the slave node 220 receives the synchronization message sent (310) from the master node 210, a guard time interval of a predetermined length begins. The second pattern recognizer 720 in the slave node 220 only recognizes the first pattern within this guard time interval. When the guard time interval elapses, the second pattern recognizer 720 no longer detects the first pattern.

As shown in FIG. 3, after receiving the first timestamp $T_1$ sent (316) from the master node 210, the slave node 220 sends (318) a delay message to the master node 210 in order to measure the transmission delay between the master node 210 and the slave node 220. Then the slave node 220 inserts (320) a predetermined pattern (referred to as the "second pattern") into a data stream to be transmitted from the slave node 220 to the master node 210. The second pattern may or may not be same as the first pattern. The generation, insertion and other features of the second pattern are similar to those of the first pattern and will not be detailed again herein.

The first pattern recognizer 710 and the first TSU 712 in the slave node 220 work together to generate a third timestamp $T_3$ identifying when the second pattern is sent out from the PHY layer (more specifically, the PHY IF 306) of the slave node 220. The generation of the third timestamp $T_3$ at the slave node 220 is similar to the generation of the first timestamp $T_1$ at the master node 210 and will not be repeated. The slave node 220 sends (322) the second pattern to the master node 210.

Upon receipt of the second pattern sent (322) from the slave node 220, the second pattern recognizer 720 and the second TSU 722 in the master node 210 work together to generate a fourth timestamp $T_4$ identifying when the second pattern arrives at the PHY layer (more specifically, the PHY IF 304) of the master node 210. In some embodiments, a guard time interval may be initiated upon receipt of the delay request message sent (318) from the slave node 220. The master node 210 recognizes the second pattern only in the guard time interval to avoid potential false detection. The generation of the fourth timestamp $T_4$ at the master node 210 is similar to the generation of the second timestamp $T_2$ at the slave node 220 and will not be repeated. The generated fourth timestamp $T_4$ is sent from the PHY IF 304 to the MAC layer 302 of the master node 210. Then the master node 210 sends (324) the fourth timestamp $T_4$ to the slave node in a delay response message responsive to the delay request message.

In this way, the slave node 220 obtains four timestamps $T_1$, $T_2$, $T_3$ and $T_4$. The slave node 220 may use these timestamps to synchronize its slave clock to the master clock at the master node 210. For example, in one embodiment, the offset between the master clock and the slave clock can be calculated as follows:

$$\text{Clock\_Offset} = (T_4 + T_1 - T_2 - T_3)/2$$

The communication latency between the master node 210 and the slave node 220

$$\text{Latency} = (T_2 + T_4 - T_3 - T_1)/2$$

Since each of the timestamps is generated with very high accuracy, the accuracy of the clock synchronization between the master node 210 and the slave node 220 can be significantly improved, for example, to sub-nanosecond level.

Figure 8:
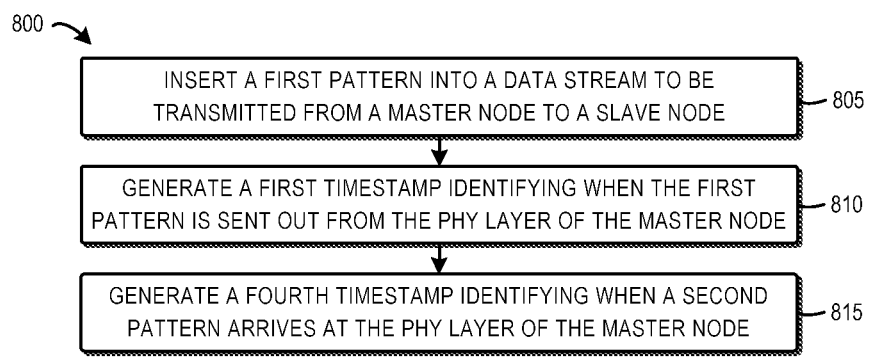
FIG. 8 is a flowchart of a method for clock synchronization implemented at a master node in accordance with embodiments of the present invention.

FIG. 8 shows a flowchart of a method 800 for clock synchronization implemented at the master node 210 in accordance with embodiments of the present invention.

In step 805, a first pattern is inserted in a data stream to be transmitted from a master node to a slave node. In some embodiments, the first pattern is inserted in response to a synchronization message being sent from the master node to the slave node to initiate the clock synchronization. In addition, in some embodiments, one or more blocks in an IPG between the data packets in the outgoing data stream may be removed to compensate for the throughput cost caused by the inserting of the first pattern.

In some embodiments, the first pattern is inserted at the PCS in the physical layer of the master node. For example, in some embodiments where the FEC is disabled in the physical layer of the master node, the first pattern may be inserted as follows. First, a raw pattern is determined in such a way that scrambling the raw pattern produces the first pattern. A time interval is then determined based on a size of the raw pattern. During the time interval, scrambling of the outgoing data stream will be suspended to allow the scrambling of the raw pattern to be performed. Alternatively, in other embodiments where the FEC is enabled in the physical layer of the master node, the raw pattern may be determined such that performing FEC encoding on the raw pattern produces the first pattern. A time interval is determined based on a size of the raw pattern. During the time interval, FEC encoding of the outgoing data stream will be suspended to allow the FEC encoding of the raw pattern to be performed.

In step 810, a first timestamp is generated to identify when the first pattern is sent out from a physical layer of the master node. In some embodiments, the physical layer of the master node includes a serializer for serializing outgoing data. In such embodiments, in response to recognizing the first pattern before the first pattern is serialized by the serializer, an offset of the first pattern with respect to a width of a parallel data interface of the serializer may be determined. In addition, a delay associated with the recognition of the first pattern is determined. The first timestamp may be generated based on a high speed clock for the series data interface of the serializer, a low speed clock for the parallel data interface of the serializer, the offset and the delay.

In step 815, a fourth timestamp is generated to identify when a second pattern arrives at the physical layer of the master node. As described above, the second pattern is inserted in a data stream that is transmitted from the slave node to the master node.

In some embodiments, the physical layer of the master node includes a deserializer for deserializing incoming data. In such embodiments, in response to recognizing the second pattern after the second pattern is deserialized by the deserializer, an offset of the second pattern with respect to a width of the parallel data interface of the deserializer is determined. In addition, a delay associated with the recognition of the second pattern is determined. Then the fourth timestamp is generated based on a high speed clock for the series data interface of the deserializer, a low speed clock for the parallel data interface of the deserializer, the offset and the delay.

In some embodiments, in response to receiving a delay request message from the slave node, the second pattern is recognized within a guard time period of a predetermined length. The delay request message is received after sending the first timestamp to the slave node. In some embodiments, the fourth timestamp is sent to the slave node in a delay response message responsive to the delay request message.

Figure 9:
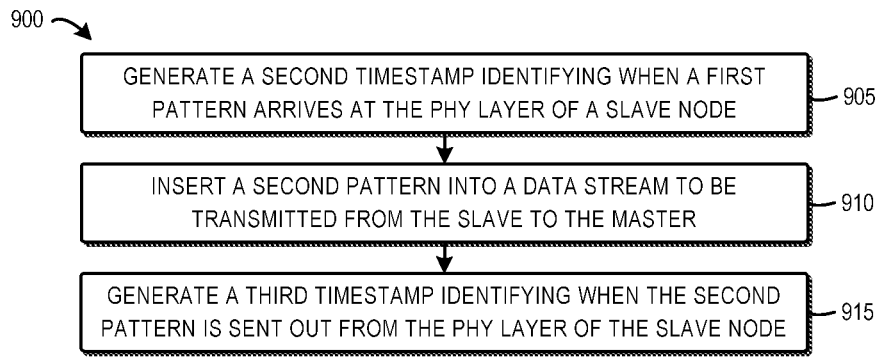
FIG. 9 is a flowchart of a method for clock synchronization implemented at a slave node in accordance with embodiments of the present invention.

FIG. 9 shows a flowchart of a method 900 for clock synchronization implemented at the slave node 220 in accordance with embodiments of the present invention.

In step 905, a second timestamp is generated to identify when a first pattern arrives at a physical layer of a slave node, where the first pattern is sent from a master node to the slave node and inserted in an incoming data stream transmitted from the master node to the slave node.

In some embodiments, in response to receiving a synchronization message from the master node to initiate the clock synchronization, the first pattern is recognized in a guard time period of a predetermined length for generating the second timestamp.

In some embodiments, the physical layer includes a deserializer for deserializing incoming data. In such embodiments, the second timestamp may be generated in the following way. In response to recognizing the first pattern after the first pattern is deserialized by the deserializer, an offset of the first pattern with respect to a width of the parallel data interface of the deserializer is determined. Also, a delay associated with the recognition of the first pattern is determined. The second timestamp is then generated based on a high speed clock for the series data interface of the deserializer, a low speed clock for the parallel data interface of the deserializer, the offset and the delay.

In step 910, a second pattern is inserted into a data stream to be transmitted from the slave node to the master node. Similar to the first pattern, the throughput cost caused by the insertion of the second pattern can be compensated by removing one or more blocks from IPG between the data packets.

In some embodiments, the second pattern is inserted at the PCS in the physical layer of the slave node. For example, in some embodiments where the FEC is disabled in the physical layer of the slave node, a raw pattern may be determined such that scrambling the raw pattern produces the second pattern. The raw pattern is then caused to be scrambled during a time interval which is determined based on a size of the raw pattern. Scrambling of the outgoing data stream will be suspended during the time interval. Alternatively, in other embodiments where the FEC is enabled in the physical layer of the slave node, the raw pattern may be determined such that performing FEC encoding on the raw pattern produces the second pattern. In such embodiments, the raw pattern may be determined such that performing FEC encoding on the raw pattern produces the second pattern. Then the raw pattern is FEC encoded during a time interval. The time interval is determined based on a size of the raw pattern and the FEC encoding of the outgoing data stream will be suspended during the time interval.

In step 915, a third timestamp is generated to identify when the second pattern is sent out from the physical layer of the slave node. In some embodiments, the physical layer includes a serializer for serializing outgoing data. In such embodiments, the third timestamp may be generated in the following way. In response to recognizing the second pattern before the second pattern is serialized by the serializer, an offset of the second pattern with respect to a width of the parallel data interface of the serializer is determined. In addition, a delay associated with the recognition of the second pattern is determined. The third timestamp is generated based on a high speed clock for the series data interface of the serializer, a low speed clock for the parallel data interface of the serializer, the offset and the delay.

In some embodiments, the method 900 further comprises receiving a first timestamp from the master node, where the first timestamp identifies when the first pattern is sent out from a physical layer of the master node. The method 900 may further comprise receiving a fourth timestamp from the master node, where the fourth timestamp identifies when the second pattern arrives at the physical layer of the master node.

Figure 10:
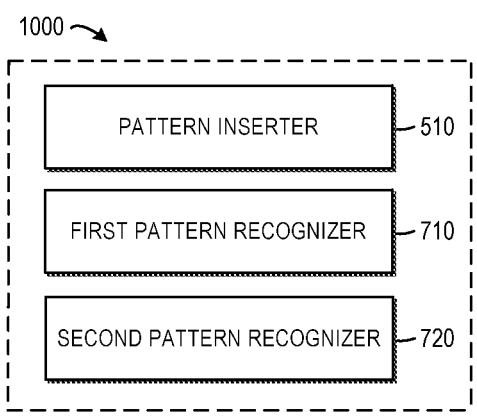
FIG. 10 is a block diagram of an apparatus for clock synchronization in accordance with embodiments of the present invention.

FIG. 10 shows a block diagram of an apparatus 1000 for clock synchronization in accordance with embodiments. The master node 210 and the slave node 220 may each include the apparatus 1000. For the apparatus 1000 in the master node 210, the master node 210 is the first node, and the slave node 220 is the second node. For the apparatus 1000 in the slave node 220, the slave node 220 is the first node, and the master node 210 is the second node.

As shown, the apparatus 1000 includes a pattern inserter 510 configured to insert an outgoing pattern into an outgoing data stream to be transmitted from a first node to a second node. The apparatus 1000 also includes a first pattern recognizer 710 configured to recognize the outgoing pattern at the first node for generating an outgoing timestamp, where the outgoing timestamp identifies when the outgoing pattern is sent out from the physical layer of the first node. In addition, the apparatus 1000 includes a second pattern recognizer 720 configured to recognize an incoming pattern at the first node for generating an incoming timestamp, where the incoming timestamp identifying when the incoming pattern arrives at the physical layer of the first node. As described above, the incoming pattern is inserted in a data stream transmitted from the second node to the first node.

All the features described in the earlier paragraphs apply to the apparatus 1000. For example, if the physical layer disables the FEC, the pattern inserter 510 may be coupled to a scrambler and rate matching logic in the PCS. In such embodiments, the pattern inserter 510 may be configured to determine a raw pattern such that scrambling the raw pattern by the scrambler produces the outgoing pattern, provide a size of the raw pattern to the rate matching logic, and input the raw pattern to the scrambler under control of the rate matching logic.

Alternatively, if the physical layer disables the FEC, the pattern inserter 510 may be coupled to the rate matching logic in the PCS of the first node and to the FEC encoder. In such embodiments, the pattern inserter 510 may be configured to determine a raw pattern such that encoding the raw pattern by the FEC encoder produces the outgoing pattern, provide a size of the raw pattern to the rate matching logic, and input the raw pattern to the FEC encoder under control of the rate matching logic.

It would be appreciated that partitioning of components in the apparatus 1000 is merely for the purpose of illustration without suggesting any limitation as to the scope of the present invention. For example, although shown as two separate components, the first and second pattern recognizers 710 and 720 may be implemented as a single physical device. In such embodiments, the TSUs 712 and 722 may be implemented by a single TSU. As another example, the serializer and deserializer in HSS may be implemented by a single physical device.

The present invention may be a system, an apparatus, a device, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present invention. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A computer-implemented method comprising:
   inserting a first pattern into an outgoing data stream to be transmitted from a master node to a slave node;
   generating a first timestamp identifying when the first pattern is sent out from a physical layer of the master node; and
   generating a fourth timestamp identifying when a second pattern arrives at the physical layer of the master node, the second pattern being inserted in an incoming data stream transmitted from the slave node to the master node,
   wherein the first timestamp and the fourth timestamp are sent from the master node to the slave node for clock synchronization between the master node and the slave node,
   wherein inserting the first pattern comprises:
   inserting the first pattern into the outgoing data stream in response to a synchronization message being sent from the master node to the slave node to initiate the clock synchronization; and
   removing at least one block from an inter packet gap (IPG) in the outgoing data stream to compensate for a throughput cost caused by the inserting of the first pattern.

2. The method of claim 1, wherein inserting the first pattern comprises:
   inserting the first pattern into the outgoing data stream at a physical coding sub-layer (PCS) in the physical layer of the master node.

3. The method of claim 1, wherein forward error correction (FEC) is disabled in the physical layer of the master node, and wherein inserting the first pattern comprises:
   determining a raw pattern such that scrambling the raw pattern produces the first pattern; and
   causing the raw pattern to be scrambled during a time interval that is determined based on a size of the raw pattern, scrambling of the outgoing data stream being suspended during the time interval.

4. The method of claim 1, wherein forward error correction (FEC) is enabled in the physical layer of the master node, and wherein inserting the first pattern comprises:
   determining a raw pattern such that performing FEC encoding on the raw pattern produces the first pattern; and
   causing FEC encoding to be performed on the raw pattern during a time interval that is determined based on a size of the raw pattern, FEC encoding of the outgoing data stream being suspended during the time interval.

5. The method of claim 1, wherein the physical layer of the master node includes a serializer that receives the outgoing data stream via a parallel data interface and outputs serialized data stream via a series data interface, and wherein generating the first timestamp comprises:
   in response to recognizing the first pattern before the first pattern is serialized by the serializer, determining an offset of the first pattern with respect to a width of the parallel data interface of the serializer;
   determining a delay associated with the recognition of the first pattern; and
   generating the first timestamp based on a high speed clock for the series data interface of the serializer, a low speed clock for the parallel data interface of the serializer, the offset and the delay.

6. The method of claim 1, wherein the physical layer of the master node includes a deserializer that receives the incoming data stream via a series data interface and outputs deserialized data stream via a parallel data interface, and wherein generating the fourth timestamp comprises:
   in response to recognizing the second pattern after the second pattern is deserialized by the deserializer, determining an offset of the second pattern with respect to a width of the parallel data interface of the deserializer;
   determining a delay associated with the recognition of the second pattern; and
   generating the fourth timestamp based on a high speed clock for the series data interface of the deserializer, a low speed clock for the parallel data interface of the deserializer, the offset and the delay.

7. The method of claim 1, wherein generating the fourth timestamp comprises:
   in response to receiving a delay request message from the slave node, recognizing the second pattern within a guard time period of a predetermined length for generating the fourth timestamp, the delay request message being received after sending the first timestamp to the slave node, and wherein the method further comprises:
in response to the delay request message, sending the fourth timestamp to the slave node in a delay response message.

8. A computer-implemented method comprising:
generating a second timestamp identifying when a first pattern arrives at a physical layer of a slave node, the first pattern being inserted in an incoming data stream transmitted from a master node to the slave node;
inserting a second pattern into an outgoing data stream to be transmitted from the slave node to the master node; and
generating a third timestamp identifying when the second pattern is sent out from the physical layer of the slave node,
wherein the second timestamp and the third timestamp are used for clock synchronization between the master node and the slave nod;
wherein generating the second timestamp comprises:
in response to receiving a synchronization message from the master node to initiate the clock synchronization, recognizing the first pattern in a guard time period of a predetermined length for generating the second timestamp.

9. The method of claim 8, further comprising:
receiving a first timestamp from the master node, the first timestamp identifying when the first pattern is sent out from a physical layer of the master node; and
receiving a fourth timestamp from the master node, the fourth timestamp identifying when the second pattern arrives at the physical layer of the master node.

10. The method of claim 8, wherein forward error correction (FEC) is disabled in the physical layer of the slave node, and wherein inserting the second pattern comprises:
determining a raw pattern such that scrambling the raw pattern produces the second pattern; and
causing the raw pattern to be scrambled during a time interval that is determined based on a size of the raw pattern, scrambling of the outgoing data stream being suspended during the time interval.

11. The method of claim 8, wherein forward error correction (FEC) is enabled in the physical layer of the slave node, and wherein inserting the second pattern comprises:
determining a raw pattern such that performing FEC encoding on the raw pattern produces the second pattern; and
causing FEC encoding to be performed on the raw pattern during a time interval that is determined based on a size of the raw pattern, FEC encoding of the outgoing data stream being suspended during the time interval.

12. The method of claim 8, wherein the physical layer includes a deserializer for deserializing that receives the incoming data stream via a series data interface and outputs deserialized data stream via a parallel data interface, and wherein generating the second timestamp comprises:
in response to recognizing the first pattern after the first pattern is deserialized by the deserializer, determining an offset of the first pattern with respect to a width of the parallel data interface of the deserializer;
determining a delay associated with the recognition of the first pattern; and
generating the second timestamp based on a high speed clock for the series data interface of the deserializer, a low speed clock for the parallel data interface of the deserializer, the offset and the delay.

13. The method of claim 8, wherein the physical layer includes a serializer that receives the outgoing data stream via a parallel data interface and outputs serialized data stream via a series data interface, and wherein generating the third timestamp comprises:
in response to recognizing the second pattern before the second pattern is serialized by the serializer, determining an offset of the second pattern with respect to the parallel data interface of the serializer;
determining a delay associated with the recognition of the second pattern; and
generating the third timestamp based on a high speed clock for the series data interface of the serializer, a low speed clock for the parallel data interface of the serializer, the offset and the delay.

14. An apparatus comprising:
a pattern inserter configured to insert an outgoing pattern into an outgoing data stream to be transmitted from a first node to a second node;
a first pattern recognizer configured to recognize the outgoing pattern at the first node for generating an outgoing timestamp, the outgoing timestamp identifying when the outgoing pattern is sent out from the physical layer of the first node; and
a second pattern recognizer configured to recognize an incoming pattern at the first node for generating an incoming timestamp, the incoming timestamp identifying when the incoming pattern arrives at the physical layer of the first node, the incoming pattern being inserted in an incoming data stream transmitted from the second node to the first node,
wherein the outgoing timestamp and the incoming timestamp are used for clock synchronization between the first node and the second node.

15. The apparatus of claim 14, wherein forward error correction (FEC) is disabled in the physical layer of the first node, and
wherein the pattern inserter is coupled to a scrambler and rate matching logic in a physical coding sub-layer (PCS) in the physical layer of the first node, the pattern inserter being configured to:
determine a raw pattern such that scrambling the raw pattern produces the outgoing pattern; and
input the raw pattern into the scrambler for scrambling within a time interval that is determined by the rate matching logic based on a size of the raw pattern, scrambling of the outgoing data stream being suspended during the time interval.

16. The apparatus of claim 14, wherein the first node includes a forward error correction (FEC) encoder in the physical layer, and
wherein the pattern inserter is coupled to rate matching logic in a physical coding sub-layer (PCS) in the physical layer of the first node and to the FEC encoder, the pattern inserter being configured to:
determine a raw pattern such that encoding the raw pattern produces the outgoing pattern; and
input the raw pattern into the FEC encoder for FEC encoding within a time interval that is determined by the rate matching logic based on a size of the raw pattern, FEC encoding of the outgoing data stream being suspended during the time interval.

17. The apparatus of claim 14, wherein the physical layer of the first node includes a serializer that receives the outgoing data stream via a parallel data interface and outputs serialized data stream via a series data interface, and
wherein the first pattern recognizer is configured to:
in response to recognizing the outgoing pattern before the outgoing pattern is serialized by the serializer, determine an offset of the outgoing pattern with respect to a width of the parallel data interface of the serializer;

determine a delay associated with the recognition of the outgoing pattern; and provide the offset and the delay to a first time stamping unit (TSU) coupled to the first pattern recognizer, wherein the first TSU is configured to generate the outgoing timestamp based on a high speed clock for the series data interface of the serializer, a low speed clock for the parallel data interface of the serializer, the offset and the delay.

18. The apparatus of claim 14, wherein the physical layer of the first node includes a deserializer that receives the incoming data stream via a series data interface and outputs deserialized data stream via a parallel data interface, and wherein the second pattern recognizer is configured to:

in response to recognizing the incoming pattern after the incoming pattern is deserialized by the deserializer, determine an offset of the incoming pattern with respect to a width of the parallel data interface of the deserializer;

determine a delay associated with the recognition of the incoming pattern; and provide the offset and the delay to a second time stamping unit (TSU) coupled to the second pattern recognizer, wherein the second TSU is configured to generate the incoming timestamp based on a high speed clock for the series data interface of the deserializer, a low speed clock for the parallel data interface of the deserializer, the offset and the delay.

* * * * *